US012661734B2

(12) United States Patent
Rappl et al.

(10) Patent No.: US 12,661,734 B2
(45) Date of Patent: Jun. 23, 2026

(54) SYSTEMS AND METHODS FOR WELDING ASSET MOVEMENT TRACKING

(71) Applicant: ILLINOIS TOOL WORKS INC., Glenview, IL (US)

(72) Inventors: James Francis Rappl, Neenah, WI (US); Todd Holverson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 124 days.

(21) Appl. No.: 16/935,440

(22) Filed: Jul. 22, 2020

(65) Prior Publication Data

US 2021/0060686 A1 Mar. 4, 2021

Related U.S. Application Data

(60) Provisional application No. 62/893,911, filed on Aug. 30, 2019.

(51) Int. Cl.
B23K 9/127 (2006.01)
B23K 9/095 (2006.01)
(Continued)

(52) U.S. Cl.
CPC ............ B23K 9/127 (2013.01); B23K 9/0956 (2013.01); B23K 9/32 (2013.01); B23K 37/006 (2013.01)

(58) Field of Classification Search
CPC ........ B23K 9/09; B23K 9/095; B23K 9/0956; B23K 9/12; B23K 9/125; B23K 9/127; B23K 9/32
See application file for complete search history.

(56) References Cited

U.S. PATENT DOCUMENTS

| 5,629,622 A | 5/1997 | Scampini |
| 5,870,267 A | 2/1999 | Kitano |
| (Continued) | | |

FOREIGN PATENT DOCUMENTS

| CN | 101391334 | 3/2009 |
| CN | 101813782 | 8/2010 |
| (Continued) | | |

OTHER PUBLICATIONS

European Patent Office, Extended European Search Report, Application No. 20190175.8, mailed Mar. 4, 2021, 5 pages.

(Continued)

*Primary Examiner* — Jimmy Chou
(74) *Attorney, Agent, or Firm* — McAndrews, Held & Malloy, Ltd.

(57) ABSTRACT

Systems and methods for welding asset movement tracking are disclosed. In some examples, a welding asset tracking system may comprise an asset tracking network of tags, hubs, and/or gateways retained by welding assets within a welding area. Directions of travel of monitored assets may be determined by comparing the order in which assets are identified by the asset tracking network. The travel directions, travel paths, and/or ingress and egress of tracked assets from welding areas are stored for subsequent analysis and/or retrieval. Additionally or alternatively, functionality of tracked assets may be disabled and/or enabled based on whether the assets are authorized to be removed from a designated area.

20 Claims, 7 Drawing Sheets

(51) Int. Cl.
    *B23K 9/32*     (2006.01)
    *B23K 37/006*     (2025.01)

(56) References Cited

U.S. PATENT DOCUMENTS

| | | | |
|---|---|---|---|
| 6,267,291 | B1 | 7/2001 | Blankenship et al. |
| 6,479,792 | B1 | 11/2002 | Beiermann et al. |
| 6,536,660 | B2 | 3/2003 | Blankenship et al. |
| 7,032,814 | B2 | 4/2006 | Blankenship |
| 7,363,137 | B2 | 4/2008 | Brant et al. |
| 7,556,532 | B2 | 7/2009 | Lee |
| 7,574,172 | B2 * | 8/2009 | Clark ..................... H04L 67/04 |
| | | | 455/39 |
| 8,502,661 | B2 | 8/2013 | Mauro |
| 8,686,318 | B2 | 4/2014 | Albrecht et al. |
| 8,748,776 | B2 | 6/2014 | Albrecht et al. |
| 9,119,023 | B2 | 8/2015 | Pina et al. |
| 9,129,330 | B2 | 9/2015 | Albrecht et al. |
| 9,138,825 | B2 | 9/2015 | Albrecht et al. |
| 9,167,408 | B2 | 10/2015 | Bucci |
| 9,204,257 | B1 | 12/2015 | Mendelson |
| 9,270,520 | B2 | 2/2016 | Dina et al. |
| 9,449,498 | B2 * | 9/2016 | Dina ..................... B23K 9/322 |
| 9,454,744 | B2 | 9/2016 | Imming |
| 9,642,112 | B2 | 5/2017 | Costa |
| 9,652,955 | B1 | 5/2017 | Ray et al. |
| 9,712,947 | B2 | 7/2017 | Dina et al. |
| 9,756,456 | B2 | 9/2017 | Dina et al. |
| 9,817,947 | B2 | 11/2017 | Hermans et al. |
| 9,862,048 | B2 | 1/2018 | Holverson et al. |
| 9,998,804 | B2 | 6/2018 | Awiszus |
| 10,140,834 | B2 | 11/2018 | Barcala |
| 10,181,060 | B2 | 1/2019 | Krug |
| 10,248,105 | B2 * | 4/2019 | Gitter .................. B23K 9/0956 |
| 10,286,475 | B2 | 5/2019 | Dina et al. |
| 10,363,627 | B2 * | 7/2019 | Denis .................. B23K 9/1087 |
| 10,419,929 | B2 | 9/2019 | Dina et al. |
| 10,608,888 | B2 * | 3/2020 | Daniel .................. H04L 67/535 |
| 10,713,448 | B2 * | 7/2020 | Hoffa ................. G06K 7/10019 |
| 10,748,442 | B2 * | 8/2020 | Batzler .................... B23K 9/32 |
| 10,977,756 | B2 | 4/2021 | Cheng |
| 11,103,948 | B2 * | 8/2021 | Holverson ........... B23K 9/1087 |
| 2002/0168937 | A1 * | 11/2002 | Clark ..................... G08C 17/02 |
| | | | 455/41.1 |
| 2004/0022227 | A1 | 2/2004 | Lynch |
| 2004/0203862 | A1 | 10/2004 | Wood |
| 2005/0145688 | A1 * | 7/2005 | Milenkovic ........ G08B 21/0261 |
| | | | 340/8.1 |
| 2005/0197115 | A1 * | 9/2005 | Clark ..................... B23K 9/32 |
| | | | 455/426.1 |
| 2006/0022867 | A1 * | 2/2006 | Hessing ................ G01S 19/072 |
| | | | 342/357.44 |
| 2006/0173619 | A1 * | 8/2006 | Brant ......................... G01S 5/02 |
| | | | 701/50 |
| 2007/0080150 | A1 | 4/2007 | Albrecht |
| 2007/0080153 | A1 | 4/2007 | Albrecht et al. |
| 2007/0205894 | A1 | 9/2007 | Nelson |
| 2008/0061049 | A1 | 3/2008 | Albrecht |
| 2008/0276179 | A1 * | 11/2008 | Borenstein ............. G06Q 10/10 |
| | | | 715/736 |
| 2010/0224610 | A1 * | 9/2010 | Wallace ............... B23K 9/0953 |
| | | | 219/136 |
| 2011/0080264 | A1 | 4/2011 | Clare |
| 2011/0080267 | A1 | 4/2011 | Clare et al. |
| 2012/0085741 | A1 | 4/2012 | Holverson et al. |
| 2012/0130534 | A1 | 5/2012 | Wurm |
| 2012/0200385 | A1 | 8/2012 | Savage |
| 2013/0200055 | A1 | 8/2013 | Enyedy et al. |
| 2013/0282392 | A1 | 10/2013 | Wurm |
| 2013/0332323 | A1 | 12/2013 | Phillips |
| 2013/0346261 | A1 | 12/2013 | Phillips |
| 2014/0124493 | A1 | 5/2014 | Enyedy |
| 2014/0240125 | A1 | 8/2014 | Burch |
| 2014/0284323 | A1 | 9/2014 | Albrecht et al. |
| 2015/0114941 | A1 | 4/2015 | Denis et al. |
| 2015/0206094 | A1 | 7/2015 | Hayes |
| 2015/0332071 | A1 | 11/2015 | Hoffa |
| 2015/0375323 | A1 | 12/2015 | Becker |
| 2016/0045971 | A1 * | 2/2016 | Holverson .............. G06F 21/35 |
| | | | 219/136 |
| 2016/0125594 | A1 | 5/2016 | Becker |
| 2016/0219405 | A1 | 7/2016 | Mishra et al. |
| 2016/0373457 | A1 | 12/2016 | Matson et al. |
| 2017/0061171 | A1 | 3/2017 | Lombardi |
| 2017/0214117 | A1 | 7/2017 | Gracyk et al. |
| 2018/0124558 | A1 | 5/2018 | Stampfl et al. |
| 2018/0193939 | A1 * | 7/2018 | Holverson .............. G07C 1/10 |
| 2018/0309935 | A1 | 10/2018 | Bashkin |
| 2019/0070686 | A1 | 3/2019 | Kooken et al. |
| 2019/0210135 | A1 | 7/2019 | Dina et al. |
| 2021/0121330 | A1 | 4/2021 | Lobner |

FOREIGN PATENT DOCUMENTS

| | | |
|---|---|---|
| CN | 102749900 | 10/2012 |
| CN | 103065210 | 4/2013 |
| CN | 104245207 | 12/2014 |
| CN | 104486975 | 4/2015 |
| CN | 104704911 | 6/2015 |
| CN | 108027950 | 5/2018 |
| CN | 108121926 | 6/2018 |
| CN | 109454311 | 3/2019 |
| CN | 109791649 | 5/2019 |
| CN | 109873870 | 6/2019 |
| CN | 110148922 | 8/2019 |
| EP | 3247525 | 11/2017 |
| JP | H1148340 | 2/1999 |
| KR | 20030083652 | 10/2003 |
| KR | 20090128646 | 12/2009 |
| WO | 2013163338 | 10/2013 |
| WO | 2017222734 | 12/2017 |

OTHER PUBLICATIONS

European Patent Office, Extended European Search Report, Application No. 20190185.7, mailed Mar. 4, 2021, 5 pages.

European Patent Office, Extended European Search Report, Application No. 20191265.6, mailed Mar. 9, 2021, 7 pages.

European Patent Office, Extended European Search Report, Application No. 20191250.8, mailed Mar. 4, 2021, 11 pages.

European Patent Office, Extended European Search Report, Application No. 20191258.1, mailed Mar. 9, 2021, 6 pages.

Canada Patent Office, Examination Report, Application No. 3,089,986, mailed Sep. 2, 2021, 2 pages.

Tile, Inc., "Find Your Keys, Wallet & Phone with Tile's App and Bluetooth Tracker Device", retrieved from https://www.thetileapp.com/en-us/, retrieved on Jul. 9, 2020, 12 pages.

Milwaukee Tool, "TICK Tool and Equipment Tracker—48-21-2000," retrieved from https://milwaukeetool.com/Prodcuts/Power-Tools/48-21-2000, retrieved on Jul. 9, 2020, 6 pages.

Canada Patent Office, Examination Report, Application No. 3,088,377, mailed Nov. 2, 2021, 8 pages.

European Patent Office, Office Action, Appln No. 20191250.8, mailed Jan. 31, 2022, 5 pages.

European Patent Office, Office Action, Application No. 20190175.8, mailed Feb. 11, 2022, 4 pages.

European Patent Office, Office Action, Application No. 20191258.1, mailed Feb. 11, 2022, 4 pages.

European Patent Office, Office Action, Application No. 20191265.6, mailed Feb. 11, 2022, 4 pages.

European Patent Office, Office Action, Application No. 20190185.7, mailed Feb. 11, 2022, 5 pages.

European Patent Office, Office Action, Application No. 20190175.8, mailed Oct. 20, 2022, 5 pages.

European Patent Office, Office Action, Application No. 20190185.7, mailed Oct. 20, 2022, 5 pages.

Canada Patent Office, Examination Report, Application No. 3,089,576, mailed Jun. 26, 2024 6 pages.

(56)         References Cited

OTHER PUBLICATIONS

European Patent Office, Office Action, Application No. 20190175.8,
mailed Jun. 28, 2023, 5 pages.

* cited by examiner

Asset Tracking Server(s) 110

SYSTEMS AND METHODS FOR WELDING ASSET MOVEMENT TRACKING

CROSS REFERENCE TO RELATED APPLICATIONS

This application claims priority from, and the benefit of, U.S. Provisional Application Ser. No. 62/893,911 entitled "SYSTEMS AND METHODS FOR WELDING ASSET MOVEMENT TRACKING," filed Aug. 30, 2019, the entirety of which is hereby incorporated by reference.

TECHNICAL FIELD

The present disclosure generally relates to systems and methods for welding asset movement tracking.

BACKGROUND

Numerous welding assets may be employed in large welding environments, such as construction sites, factories, manufacturing yards, and shipyards. As welding assets of similar types can be difficult to distinguish from one another, locating a particular welding asset in a large welding environment, or across multiple welding environments, can be difficult and time consuming. Additionally, lost, misplaced, and/or stolen welding assets can be costly to replace. Further, reallocating welding assets from one welding job to another, without first knowing if and/or how the welding assets are being used, can be inefficient.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to systems and methods for welding asset tracking, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

Figure 1:
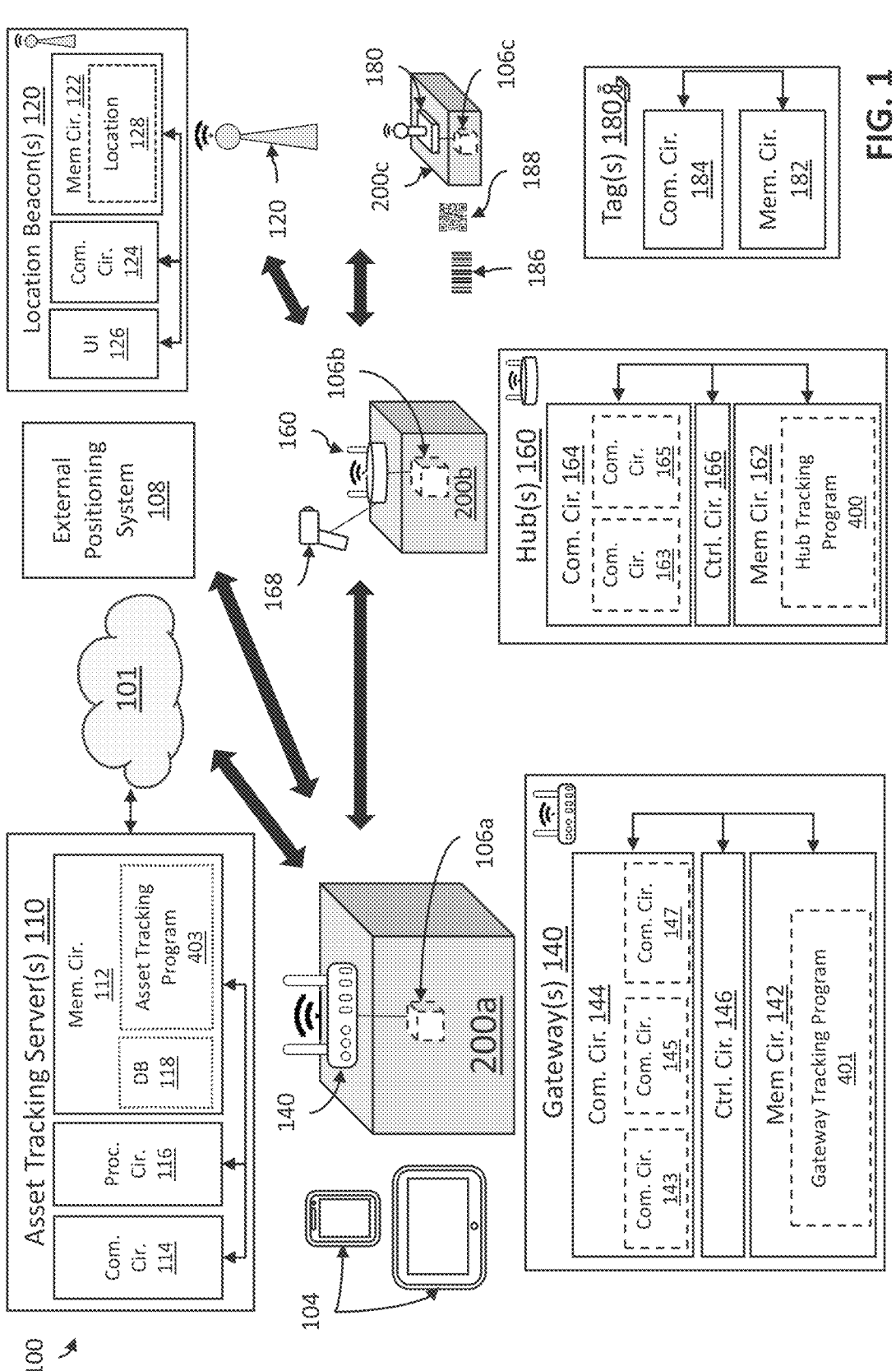
FIG. 1 depicts a welding asset tracking system, in accordance with aspects of this disclosure.

The figures are not necessarily to scale. Where appropriate, the same or similar reference numerals are used in the figures to refer to similar or identical elements. For example, reference numerals utilizing lettering (e.g., sensor 106a, sensor 106b) refer to instances of the same reference numeral that does not have the lettering (e.g., sensors 106).

DETAILED DESCRIPTION

Some examples of the present disclosure relate to a welding asset tracking system. In some examples, the welding asset tracking system may comprise an asset tracking network of tags, hubs, and/or gateways retained by welding assets within a welding area. The asset tracking network may obtain and/or communicate to an asset tracking server welding data related to one or more of the welding assets, as well as position data obtained via an internal and/or external positioning system. In this way, the welding asset tracking server may continually receive updated information regarding each welding assets identity, location, and/or use. By retaining the asset tracking network within welding assets, the asset tracking network becomes more likely to have the density necessary for continuous tracking, since welding assets tend to be positioned near other welding assets so that they can be used together. The information obtained by the welding asset tracking system may be used by a welding asset manager to locate welding assets, allocate assets to different welding jobs, determine whether assets should be brought in for maintenance, and/or determine whether new assets should be acquired.

Some disclosed examples determine directions of travel of monitored assets by comparing the order in which assets are identified by tracking devices (e.g., hubs, gateways, etc.). The travel directions, travel paths, and/or ingress and egress of tracked assets from welding areas are stored for subsequent analysis and/or retrieval. Additionally or alternatively, functionality of tracked assets may be disabled and/or enabled by a central asset tracking system based on whether the assets are authorized to be removed from a designated area.

Some examples of the present disclosure pertain to a welding asset tracking system, comprising: a first detector positioned at a first location proximate a portal or boundary of a welding area, the first detector configured to: obtain an asset identifier from a welding asset at a first time when the welding asset is in proximity of the first detector, and transmit a first signal representative of a first detector identifier, the first location, the asset identifier, or the first time; a second detector positioned at a second location that is closer to, or farther from, the portal or boundary than the first location, the second detector configured to: obtain the asset identifier from the welding asset at a second time when the welding asset is in proximity of the second detector, and transmit a second signal representative of a second detector identifier, the second location, the asset identifier, or the second time; and a welding asset tracking server configured to: receive the first signal and second signal, determine a travel direction of the welding asset based on the first location, first time, second location, and second time, and in response to determining the travel direction is towards or away from the portal or boundary of the welding area, update a welding asset tracking database to indicate the welding asset has entered into, or departed from, the welding area.

In some examples, the first detector comprises first communication circuitry configured to obtain the asset identifier from the welding asset, and the second detector comprises second communication circuitry configured to obtain the asset identifier from the welding asset. In some examples, the welding asset tracking server is configured to send an enable signal to the welding asset through the first detector or second detector in response to determining the welding asset has entered into the welding area. In some examples, the welding asset tracking server is configured to send a disable signal to the welding asset via the first detector or the second detector in response to determining the welding asset has departed from the welding area.

In some examples, the welding asset comprises a wire feeder, welding power supply, operator badge, welding helmet, air-purifying respirator, wire spool, wire barrel, work order, workpiece, welding gun, grinder, fume extractor, foot pedal, gas bottle regulator, power supply pendant, weld cable, or sensor module. In some examples, the welding asset comprises a first welding asset, and the first detector or second detector is retained by a second welding asset. In some examples, the first detector or second detector comprises a gateway. In some examples, the first detector comprises a first portion of a gateway and the second detector comprise a second portion of the gateway. In some examples, the first detector or second detector comprises a hub. In some examples, the first detector comprises a first portion of a hub and the second detector comprise a second portion of the hub.

Some examples of the present disclosure relate to a method of determining welding asset movement through a welding area, comprising: determining a first position of the welding asset, the first position being correlated with a first time; determining a second position of the welding asset, the second position being correlated with a second time that is later than the first time; determining, via processing circuitry, a travel direction of the welding asset based on the first position and second position; and in response to determining the travel direction is towards or away from a portal or boundary of the welding area, updating a welding asset tracking database to indicate the welding asset has entered into or departed from the welding area.

In some examples, determining the first position of the welding asset comprises receiving a signal from a first detector positioned at a first location proximate a portal or boundary of a welding area. In some examples, determining the second position of the welding asset comprises receiving a signal from a second detector positioned at a second location that is closer to, or farther from, the portal or boundary than the first location. In some examples, the first signal is representative of the first position. In some examples, the first signal is representative of an identifier of the first detector, wherein determining the first position further comprises determining a first detector position based on the identifier. In some examples, determining the first detector position comprises looking up a stored detector position corresponding to the identifier.

In some examples, the method further comprises sending an enable signal to the welding asset through the first detector or second detector in response to determining the welding asset has entered into the welding area. In some examples, the method further comprises sending a disable signal to the welding asset through the first gateway or second gateway in response to determining the welding asset has departed from the welding area. In some examples, the welding asset comprises a wire feeder, welding power supply, operator badge, welding helmet, air-purifying respirator, wire spool, wire barrel, work order, workpiece, welding gun, grinder, fume extractor, foot pedal, gas bottle regulator, power supply pendant, weld cable, or sensor module. In some examples, the welding asset comprises a first welding asset, and the first detector or second detector is retained by a second welding asset.

FIG. 1 shows an example of a welding asset tracking system 100. As shown, the welding asset tracking system 100 includes an asset tracking server 110, a local positioning system comprising one or more location beacons 120, and an asset tracking network comprising several welding assets 200 interconnected via one or more gateways 140, hubs 160, and/or tags 180. As shown, the gateway(s) 140, hub(s) 160, and/or tag(s) 180 are retained by the one or more welding assets 200. In some examples, one or more brackets, fasteners, housings, and/or other mechanisms may be used to retain the gateway(s) 140, hub(s) 160, and/or tag(s) 180 in and/or on the welding assets 200. In some examples, one or more mobile devices 104 (e.g., smartphones, tablet computers, laptop computers, etc.) configured for use with the welding asset tracking system 100 may also take on the role of a gateway 140 and/or asset tracking server 110. In some examples, one or more of the gateways 140, hubs 160, and/or tags 180 may not be retained by a welding asset 200.

Figure 2:
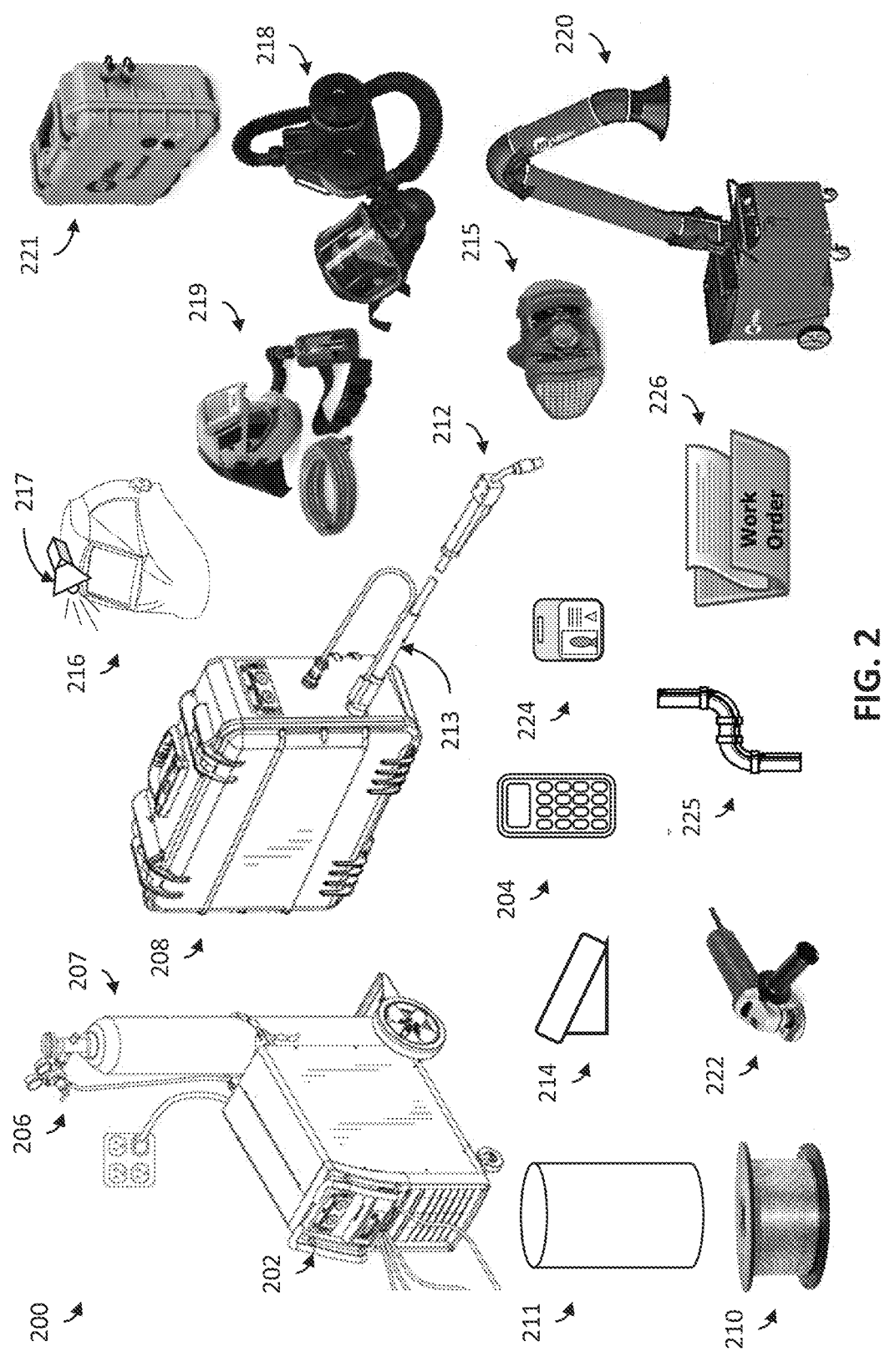
FIG. 2 shows examples of different welding assets that may be used with the welding asset tracking system of FIG. 1, in accordance with aspects of this disclosure.

A welding asset 200, as used herein, may refer to any device, equipment, accessory, and/or tool used for welding and/or welding-type activities (e.g., metal fabrication, induction heating, grinding, polishing, plasma cutting, etc.). FIG. 2 shows several common examples of welding assets 200 that may be used with the welding asset tracking system 100. As shown, common welding assets 200 may include a welding (and/or welding-type) power supply 202, a power supply pendant 204, a gas bottle regulator 206, a gas bottle 207, a welding wire feeder 208, a wire spool 210, a wire barrel 211, a welding torch 212, a welding cable 213, a foot pedal 214, a respirator mask 215, a welding helmet 216, a light 217 (e.g., attached to, or separate from, the welding helmet 216), a powered air-purifying respirator (PAPR) 218, a supplied air respirator (SAR) 219, a fume extractor 220 (e.g., to extract welding fumes), a box filtration system 221, a grinder 222, an operator id badge 224, welding material 225 (e.g., welding workpiece(s)), and a welding work order 226 (e.g., affixed to a bin or pallet containing welding material 225, or the welding material 225 itself). In some examples, the welding torch 212 may be a welding gun or plasma torch. In some examples, the welding torch 212 may be robot and/or machine operated.

In the example of FIG. 1, each welding asset 200 includes one or more sensors 106. In some examples, the one or more sensors 106 may be configured to continuously and/or periodically sense, detect, measure, and/or record sensor data relating to the operation(s) (and/or error(s)) of that particular welding asset 200. For example, a welding power supply 202 may have one or more sensors 106 configured to sense, detect, measure, and/or record an input, intermediate, and/or output current and/or voltage, an arc time, a cooling airflow amount, a cooling device (e.g., fan) on time, a weld start/stop time, and/or a total energy amount outputted. As another example, a wire feeder 208 may have one or more sensors 106 configured to sense, detect, measure, and/or record a wire feed speed, a motor current, motor voltage, a cooling airflow amount, a cooling device (e.g., fan) on time, roller torque, roller speed, and/or a total amount of filler material output. As another example, a gas regulator 206 may have one or more sensors 106 configured to sense, detect, measure, and/or record gas flow rate, gas temperature, gas mixture, and/or total gas output. As another example, a welding helmet 216 may have one or more sensors 106 configured to sense, detect, measure, and/or record temperature in and/or around the welding helmet 216, air quality in and/or around the welding helmet 216, an electromagnetic field (e.g., strength, direction, etc.) proximate the welding helmet 216, motion of the welding helmet 216, whether the helmet 216 is in a darkened state (e.g., for auto-darkening helmets), and/or the total amount of time spent in the darkened state (and/or undarkened state). As another example, a welding torch 212 may have one or more sensors 106 configured to sense, detect, measure, and/or record trigger activation start/stop time, activation duration, arc time, position (e.g., with respect to welding material 225 and/or a fixture), orientation (e.g., with respect to welding material 225 and/or a fixture), motion (e.g., with respect to welding material 225 and/or a fixture), current, and/or voltage. As another example, a foot pedal 214 may have one or more sensors 106 configured to sense, detect, measure, and/or record pedal activation start/stop time, activation duration, and/or activation pressure. As another example, a pendant 204 may have one or more sensors 106 configured to sense, detect, measure, and/or record a recent command history. As another example, an operator badge 224 may have one or more sensors 106 configured to sense, detect, measure, and/or record a scanning history (e.g., where the badge is scanned when entering/exiting certain areas and/or using certain assets). As another example, a PAPR 218 or fume extractor 220 may have one or more sensors 106 configured to sense, detect, measure, and/or record air circulation amounts, air quality, air temperature, and/or a condition of a filter.

In some examples, the one or more sensors 106 may detect and/or record a time corresponding to the sensing, detection, measurement, and/or recording of the sensor data. In some examples, one or more of the welding assets 200 may have no sensor 106. In some examples, a stand-alone sensor 106 configured to be removably attached to some third party (e.g., competitor) welding asset may be considered a welding asset 200 in and of itself. For example, a Hall Effect sensor or magnetic reed switch sensor configured to be attached to a welding cable and/or detect current through the welding cable may be fitted with its own tag 180, effectively making the sensor 106 itself a welding asset 200. As another example, an air flow sensor configured to be attached to a welding power supply 202 (e.g., within the interior and/or in fluid communication with external vents) may be configured to detect cooling air circulating through the welding power supply 202 and fitted with its own tag 180, effectively making the sensor 106 itself a welding asset 200.

In the example of FIG. 1, each sensor 106 has an electrical and/or communication link to a tag 180, hub 160, and/or gateway 140 retained by a welding asset 200. Through this link, sensor data sensed, detected, measured, and/or recorded by the sensor may be communicated to the tag 180, hub 160, and/or gateway 140 retained by the welding asset 200. As shown, the tag 180, hub 160, and gateway 140 have tag memory circuitry 182, hub memory circuitry 162, and gateway memory circuitry 142, respectively, configured to store the sensor data. In some examples, the tag memory circuitry 182, hub memory circuitry 162, and/or gateway memory circuitry 142 may also store a time corresponding to the detection, measurement, recordation, and/or reception of the sensor data. In some examples, the tag memory circuitry 182, hub memory circuitry 162, and/or gateway memory circuitry 142 may also store some other data related to the welding asset 200. The tag memory circuitry 182, hub memory circuitry 162, and/or gateway memory circuitry 142 may also store an identifier (e.g., serial number) that is unique within the welding asset tracking system 100 and/or associated with the welding asset 200 retaining the tag 180, hub 160, or gateway 140 (and/or associated with the tag 180, hub 160, or gateway 140 itself).

In some examples, smaller and/or less sophisticated welding assets 200c (e.g., wire spools 210, work orders 226, welding material 225, operator badges 224, welding guns 212, grinders 222, welding helmets 216, etc.), and/or welding assets 200c that change location frequently, may retain tags 180. In some examples, the tags 180 may be relatively cheap and/or simple devices and/or mechanisms. In the example of FIG. 1, the tag 180 includes tag communication circuitry 184 and tag memory circuitry 182 in electrical communication with one another. As discussed above, the tag memory circuitry 182 may store sensor data, one or more identifiers, and/or other data related to the retaining welding asset 200c. The tag communication circuitry 184 may be configured for shorter range communication, such as, for example, via a short wavelength ultra-high frequency protocol (commonly referred to as Bluetooth), an IEEE 802.15.4 standard protocol (commonly referred to as Zigbee), a near field communication (NFC) protocol, and/or a radio frequency identification (RFID) protocol. In some examples, the tag communication circuitry 184 may communicate data (i.e., tag data) stored in the tag memory circuitry 182 via the tag communication circuitry 184.

In some examples, a tag 180 may be so simple as to have no circuitry. For example, a simple welding asset 200 (e.g., wire spool) with no sensor 106 may record no dynamic data and/or have no need of dynamically updatable memory circuitry. In such an example, a tag 180 may be implemented via a (e.g., linear and/or one dimensional) barcode 186 or matrix (and/or two dimensional) barcode 188. In some examples, the tag 180 (and/or barcode 186 or matrix barcode 188) may be retained on an outside of the welding asset 200a or within a housing, chassis, cover, etc. of the welding asset 200a.

In some examples, moderately sized and/or moderately sophisticated welding assets 200b (e.g., welding helmets 216, wire feeders 208, power supplies 202), and/or welding assets 200 that only change locations occasionally, may retain hubs 160. In some examples, the hubs 160 may be retained on an outside of welding assets 200b or within a housing, chassis, cover, etc. of the welding assets 200b. In some examples, the hub retaining welding assets 200b may have existing circuitry (e.g., memory, control, and/or communication circuitry) that can be supplemented relatively easily and/or cheaply to give the welding assets 200b capabilities of a hub 160.

In the example of FIG. 1, the hub 160 includes hub memory circuitry 162, hub control circuitry 166, and hub communication circuitry 164, in electrical communication with one another. In addition to identifiers and/or sensor data, the hub memory circuitry 162 is shown storing a hub tracking program 400 that guides the hub 160 in fulfilling its role in the welding asset tracking system 100, as discussed further below. The hub control circuitry 166 controls the operation of the hub 160 in accordance with the hub tracking program 400. In some examples, the hub control circuitry 166 may comprise one or more processors.

In the example of FIG. 1, the hub communication circuitry 164 includes short range hub communication circuitry 163. In some examples, the short range hub communication circuitry 163 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the hub 160 may obtain tag data from nearby tags 180 (and/or their tag communication circuitry 184 and/or tag memory circuitry 182) in communication range using the short range hub communication circuitry 163. In some examples, a hub 160 may be configured to only communicate with and/or obtain tag data from specific tags 180, specific welding assets 200, and/or specific types of welding assets 200 (e.g., based on identifier (s)).

In the example of FIG. 1, the hub 160 is linked to a barcode scanner 168 configured to obtain tag data from a barcode 186 and/or matrix barcode 188. In some examples, the hub 160 may use the barcode scanner 168 instead of, or in addition to, the short range hub communication circuitry 163 to obtain tag data. For example, a wire feeder 208 (comprising a welding asset 200*b*) may have a barcode scanner 168 positioned and/or configured to scan a barcode 186 or matrix barcode 188 imprinted on an outer portion of a wire spool 210 when the wire spool 210 is loaded into the wire feeder 208. In some examples, the hub 160 may store the tag data (as well as a corresponding time the tag data is sent and/or received) in hub memory circuitry 162.

In the example of FIG. 1, the hub communication circuitry 164 also includes long range hub communication circuitry 165. In some examples, the long range hub communication circuitry 165 may be configured for longer range wireless communications, such as, for example, via a cellular and/or IEEE 802.11 standard (commonly referred to as WiFi) protocol. As shown, the hub 160 may be in communication with one or more gateways 140 of the welding asset tracking system 100 via the long range hub communication circuitry 165. In some examples, the hub 160 may send tag data obtained from nearby tags 180 to one or more gateways 140 in communication with the hub 160 via the long range hub communication circuitry 165. In some examples, the hub 160 may additionally, or alternatively, send an identifier of the welding asset 200*b* (and/or hub 160), sensor data from the sensor 106*b*, and/or other data relating to the welding asset 200*b* to one or more gateways 140 in communication with the hub 160 via the long range hub communication circuitry 165. Collectively, this data may be referred to as hub data. In some examples, the hub 160 may send tag data and/or hub data directly to the asset tracking server 110 via the long range hub communication circuitry 165. In some examples, the hub 160 may send the tag data and/or hub data to a second hub 160 of the welding asset tracking system 100, such as, for example, if the hub communication circuitry 164 is unable to establish communication with a gateway 140 and/or the asset tracking server 110. In such an example, the second hub 160 may either be in communication with a gateway 140 (in which case tag data and/or hub data may be sent to the gateway 140) or also unable to establish communication with a gateway 140. If the second hub 160 is also unable to establish communication with a gateway 140, the tag data and/or hub data may be forwarded to a third hub 160 (and so on and so on until the data arrives at a hub 160 in communication with a gateway 140).

In the example of FIG. 1, the gateway 140 is retained by a welding asset 200*a*. In some examples, larger and/or more sophisticated welding assets 200*a* (e.g., wire feeders 208, power supplies 202, etc.), and/or welding assets 200*a* that rarely change location significantly, may retain gateways 140. In some examples, the gateways 140 may be more sophisticated and/or expensive devices. Nevertheless, in some examples, the welding assets 200*a* may have existing circuitry that can be supplemented relatively easily and/or cheaply to give the welding asset 200*a* gateway capabilities.

In the example of FIG. 1, each gateway 140 includes gateway memory circuitry 142, gateway control circuitry 146, and gateway communication circuitry 144 in electrical communication with one another. In addition to identifiers and/or sensor data, the gateway memory circuitry 142 stores a gateway tracking program 401 that guides the gateway 140 in fulfilling its role in the welding asset tracking system 100, as discussed further below. The gateway control circuitry 146 controls the operation of the gateway 140 in accordance with the gateway tracking program 401. In some examples, the gateway control circuitry 146 may comprise one or more processors.

In the example of FIG. 1, the gateway communication circuitry 144 includes short range gateway communication circuitry 143. In some examples, the short range gateway communication circuitry 143 may be configured for shorter range wireless communication, such as, for example, via a short wavelength ultra-high frequency protocol (commonly referred to as Bluetooth), an IEEE 802.15.4 standard protocol (commonly referred to as Zigbee), an NFC protocol, and/or an RFID protocol. In some examples, the gateway 140 may obtain tag data from nearby tags 180 and/or hub data from nearby hubs 160 (in communication range using the short range gateway communication circuitry 143. Though not shown, in some examples, the gateway 140 may be linked to a barcode scanner 168 and obtain tag data from a barcode 186 and/or matrix barcode 188 using the barcode scanner 168. In some examples, the gateway 140 may store the tag data and/or hub data (as well as a corresponding time the tag/hub data is sent and/or received) in gateway memory circuitry 142.

In the example of FIG. 1, the gateway communication circuitry 144 also includes long range gateway communication circuitry 145. In some examples, the long range gateway communication circuitry 145 may be configured for longer range wireless communications, such as, for example, via a cellular and/or IEEE 802.11 standard (commonly referred to as WiFi) protocol. As shown, the gateway 140 may be in communication with one or more hubs 160 of the welding asset tracking system 100 via the long range gateway communication circuitry 145. In some examples, the gateway 140 may receive hub data (and/or asset identifiers, sensor data, timestamps, etc.) obtained from nearby hubs 160 via the long range gateway communication circuitry 145. In some examples, the gateway 140 may also communicate with other gateways 140 of the welding asset tracking system 100 via the gateway communication circuitry 144 (long and/or short range).

In the example of FIG. 1, the gateway 140 also includes global positioning system (GPS) communication circuitry 147. As shown, the gateway 140 is in communication with an external positioning system 108 (e.g., GPS, WiFi, and/or cellular positioning system). In some examples, the GPS communication circuitry 147 may enable communication with the external positioning system 108. In some examples, the external positioning system 108 may provide the gateway 140 with a position (e.g., latitude and/or longitude) of the gateway 140 and/or retaining welding asset 200*a* via the external positioning system 108 and/or GPS communication circuitry 147. In some examples, one or more hubs 160 may also have GPS communication circuitry 147 (and/or other appropriate communication circuitry) with which to communicate with, and/or obtain position information from, the external positioning system 108.

In the example of FIG. 1, the hubs 160 are in communication (e.g., via short range hub communication circuitry 163) with a local positioning system comprising one or more location beacons 120. In some examples, the gateways 140 may also be in communication (e.g., via short range gateway communication circuitry 143) with the local positioning system. In some examples, the local positioning system may be used to estimate and/or determine a (relative, local, and/or global) position of a gateway 140, hub 160, tag 180, and/or welding asset 200, such as, for example, in situations where the external positioning system 108 is unavailable, unreachable, and/or otherwise not an option. In some examples, multiple location beacons 120 may be positioned throughout a welding area to provide a dense, granular, and/or more precise local positioning system.

In the example of FIG. 1, the location beacon 120 of the local positioning system includes beacon memory circuitry 122, beacon communication circuitry 124, and a beacon user interface (UI) 126 in electrical communication with one another. As shown, the beacon memory circuitry 122 stores a location 128 of the beacon 120. This beacon location 128 may be a relative position (e.g., 100 feet NW of beacon 2, halfway between front door and western window, etc.), a local position (e.g., welding cell 5, back door, front wall, loading bay, etc.), and/or a global position (e.g., 41.8823° N, 87.6404° W). In some examples, the beacon location 128 may be entered and/or modified via the beacon UI 126. In some examples, the beacon location 128 may be entered and/or modified via a third party device (e.g., mobile device 104) in communication with the location beacon 120 (e.g., via beacon communication circuitry 124). In some examples, the beacon location 128 may be communicated to hubs 160 and/or gateways 140 in communication range via beacon communication circuitry 124.

In some examples, a maximum communication range of the beacon communication circuitry 124 may be reduced to a set communication range. This reduction may be achieved via beacon UI 126 and/or third party device in communication with the beacon communication circuitry 124, for example. In some examples, the maximum communication range and/or set communication range may be stored in the beacon memory circuitry 122, and/or accessed when determining position.

In some examples, the hubs 160 and/or gateways 140 of the welding asset tracking system 100 may determine their positions via the external positioning system 108 and/or local positioning system. For example, a gateway 140 in communication with the external positioning system 108 may determine its global position via GPS communication circuitry 147, and send this position to the asset tracking server(s) 110. Thereafter, the asset tracking server 110 (and/or the gateway 140 itself) may determine and/or estimate a position of any gateways 140, hubs 160, and/or tags 180 for which the gateway 140 has obtained (and/or communicated) data. As another example, a hub 160 that cannot access the external positioning system 108 may nonetheless access one or more location beacons 120 of the local positioning system and thereby estimate and/or determine its position based on the beacon locations 128 of the location beacons 120. Thereafter, the asset tracking server 110 (and/or hub 160 itself or some gateway 140) may determine and/or estimate a position of any hubs 160 and/or tags 180 for which the hub 160 has obtained (and/or communicated) data.

In some examples, the determination and/or estimation of position may include a position radius and/or a zone of uncertainty (e.g., position within 50 meters of gateway 12, or somewhere within facility 13). In some examples, the position determination and/or estimation may be made more accurate and/or precise by using multiple location beacons 120 in combination with trilateration and/or triangulation methods. In some examples, the position determination and/or estimation may be made more accurate and/or precise by using other factors (e.g., the communication range, signal strength, signal time of flight, signal direction, etc.). In some examples, the gateway(s) 140 and/or hub(s) 160 may be configured with a plurality of antennas (e.g., 2, 3, 4, etc.) to facilitate detection of signal direction (e.g., by determining which antenna(s) first receive the signal). In some examples, the position information of the external positioning system 108 and local positioning system may be combine to more accurately and/or precisely determine position.

In some examples, one or more gateways 140, hubs 160, tags 180, and/or sensors 106 may have their position stored in their own respective memory circuitry, so that position may be determined without resorting to an external positioning system. In some examples, the gateways 140, hubs 160, tags 180, and/or sensors 106 may also be setup, updated, paired, and/or otherwise configured with position information (and/or other information) via a third party device (e.g., mobile device 104) in communication with the gateway 140, hub 160, tag 180, and/or sensor 106. In some examples, the gateways 140, hubs 160, tags 180, and/or sensors 106 retained by welding assets 200 may be setup, paired, and/or otherwise configured via an interface of the retaining welding asset 200.

In the example of FIG. 1, the gateway 140 is also in communication with one or more asset tracking server(s) 110 through a network 101 (e.g., local area network, wide area network, internet, etc.). In some examples, the gateway 140 may be in communication with the asset tracking server(s) 110 directly, without going through the network 101. In some examples, the gateway communication circuitry 144 (e.g., the long range gateway communication circuitry 145) may be configured to facilitate communication with the asset tracking server(s) 110 and/or network 101. In some examples, the asset tracking server(s) 110 may be implemented in one or more gateways 140.

In some examples, the gateways 140 may send information obtained from other gateways 140, hubs 160, and/or tags 180 to the asset tracking server(s) 110. In some examples, one or more hubs 160 may also be in communication with the asset tracking server(s) 110, and/or send information obtained from other hubs 160, and/or tags 180 to the asset tracking server(s) 110 without going through the gateway(s) 140. In some examples, one or more mobile devices 104 configured for use with the welding asset tracking system 100 may also take on the role of gateways 140 and send information obtained from other gateways 140, hubs 160, and/or tags 180 to the asset tracking server(s) 110. For example, one or more welding operators, administrators, maintenance workers, technicians, etc. may carry mobile devices 104 configured to act as mobile gateways 140 with the welding asset tracking system 100. In such an example, the mobile gateways 140 may obtain location, hub, and/or tag data (and/or gateway data) when in proximity to location beacons 120, gateways 140, hubs 160, and/or tags, and send the data to the asset tracking server(s) 110.

In the example of FIG. 1, the one or more asset tracking servers 110 include server communication circuitry 114, server processing circuitry 116, and server memory circuitry 112 in electrical communication with one another. In some examples, only one asset tracking server 110 may be used. In some examples, multiple asset tracking servers 110 may be used. As shown, the one or more asset tracking servers 110 are in communication with one or more gateways 140 through the network 101. In some examples, the asset tracking server(s) 110 may be in communication with one or more hubs 160 as well. In some examples, the asset tracking server(s) 110 may be in communication with the one or more gateways 140 and/or hubs 160 directly, without going through the network 101. In some examples, the server communication circuitry 114 may facilitate communication with the network 101, gateways 140, and/or hubs 160.

In the example of FIG. 1, the server memory circuitry 112 stores an asset tracking database 118 and an asset tracking program 403. In some examples, the asset tracking database 118 may store data obtained from the gateways 140, hubs 160, tags 180, and/or sensors 106 of the welding asset tracking system 100. In some examples, certain data may be associated in the asset tracking database 118 to facilitate reporting, analysis, and/or tracking. For example, sensor data obtained from multiple sensors 106 of the same welding asset 200 may be linked and/or associated. As another example, data pertaining to the same welding assets, or welding assets of the same or similar type, at the same or similar location, used by the same or similar operators, and/or involved the same or similar operations, may be linked and/or associated. In some examples, the asset tracking database 118 may be stored in the server memory circuitry 112 of one asset tracking server 110. In some examples, duplicates of the asset tracking database 118 may be stored across several asset tracking servers 110. In some examples, different portions of the asset tracking database 118 may be stored in several different asset tracking servers 110.

In the example of FIG. 1, the server memory circuitry 112 further stores an asset tracking program 403. In some examples, the asset tracking program 403 may comprise computer (and/or processor) readable (and/or executable) instructions. In some examples, the server processing circuitry 116 may control the operation of the asset tracking server 110 in accordance with the asset tracking program 403. In some examples, the server processing circuitry 116 may comprise one or more processors.

In some examples, the asset tracking program 403 may direct the server processing circuitry 116 to organize and/or store data received via the asset tracking network in the asset tracking database 118. In some examples, the asset tracking program 403 may further direct the asset tracking server(s) 110 to query and/or parse the data in the asset tracking database 118, such as in response to one or more user requests (e.g., received from a terminal, mobile device, and/or other device in communication with the asset tracking server(s) 110). For example, the asset tracking server 110 may receive one or more requests to locate a particular welding asset, a particular welding asset type, welding assets in a particular location, welding assets performing a particular operation, welding assets used by a particular operator, etc. In response, the asset tracking server 110 may query and/or parse the data in asset tracking database 118 to respond to the request.

Figure 3:
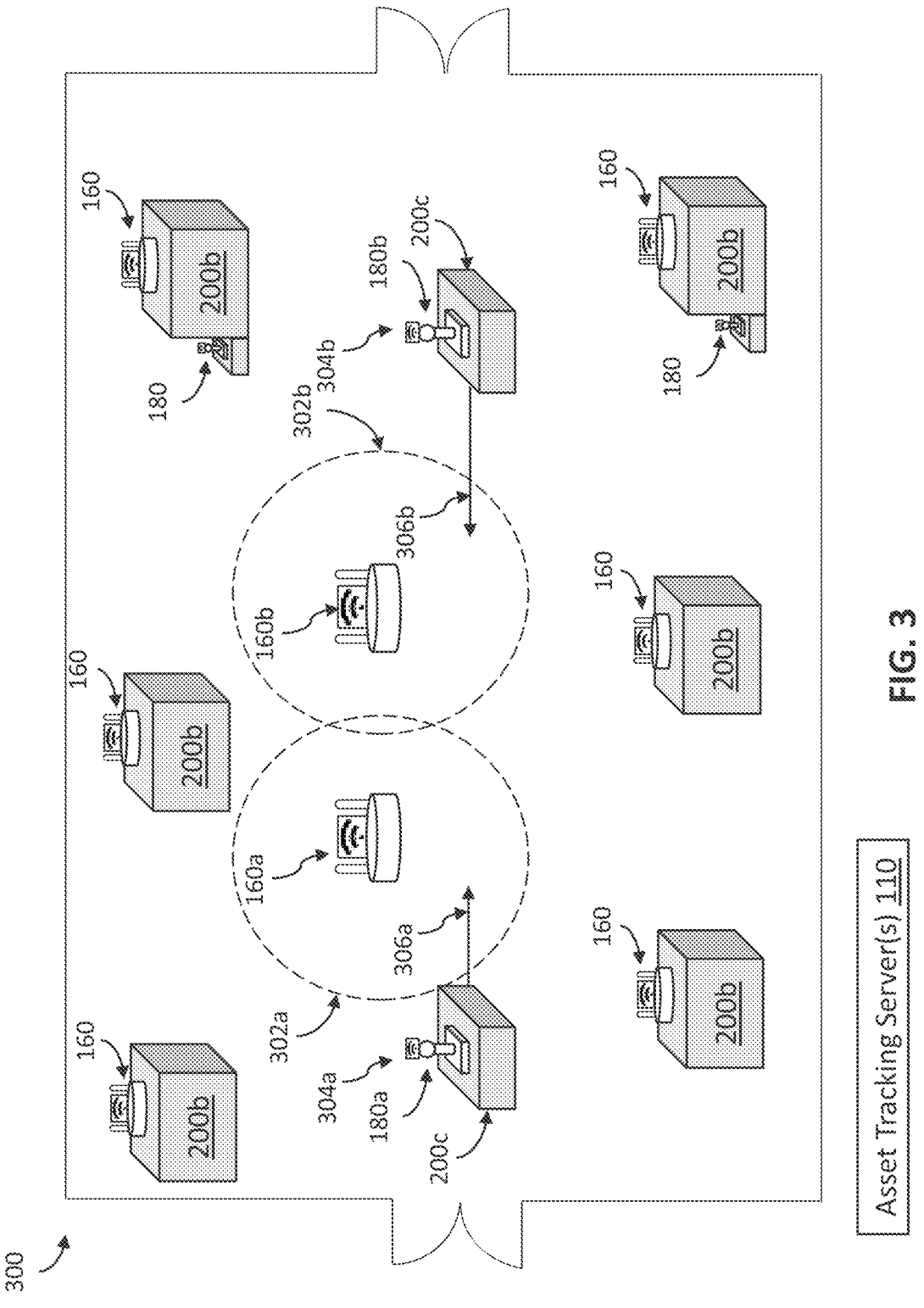
FIG. 3 is a diagram illustrating an example welding area with components of the welding asset tracking system of FIG. 1 configured to track movement of welding assets within the welding area, in accordance with aspects of this disclosure.

FIG. 3 is a diagram illustrating an example welding area 300 with components of the welding asset tracking system 100 of FIG. 1 configured to track movement of welding assets 200c within the welding area 300.

The example welding area 300 of FIG. 3 includes multiple hub retaining welding assets 200b, such as welding power supplies, wire feeders, and/or other equipment, each of which may include a respective hub 160 and/or tag retaining welding assets 200c. The welding area 300 further includes multiple standalone hubs 160a, 160b. The hub 160a of FIG. 3 has a first effective communication area 302a, within which the hub 160a can communicate with tags 180, other hubs 160, gateways 140, mobile devices 104, and/or any other devices configured to communicate with the hubs 160a, 160b. Similarly, the hub 160b has a second effective communication area 302b, within which the hub 160b can communicate with other devices. While two hubs 160a, 160b are shown in the example of FIG. 3, additional hubs and corresponding communication areas may be used. In addition to or instead of the hub retaining welding assets 200b, the welding area 300 may include one or more gateway retaining welding assets 200a, which may have similar communication areas.

In the example of FIG. 3, an asset tracking server 110 (e.g., the asset tracking server 110 of FIG. 1) is in communication with the hubs 160, 160a, 160b to monitor the locations and/or statuses of welding assets. The example asset tracking server 110 may include an asset tracking database (e.g., the database 118) and/or communicate with an external database. The asset tracking server 110 updates the asset tracking database 118 with locations and/or statuses of the assets 200a, 200b, 200c and/or other devices that communicate with the hubs 160, 160a, 160b.

The example hubs 160a, 160b are positioned such that the communication areas 302a, 302b partially overlap but also have nonoverlapping portions. In other examples, the hubs 160a, 160b have minimal or no overlap. By monitoring an order in which moving devices (e.g., mobile devices 104, assets 200a, 200b, 200c) move into and/or out of the communication areas 302a, 302b (e.g., as determined using detection by the hubs 160a, 160b), the example asset tracking server 110 may determine a direction of travel of the devices (e.g., mobile devices 104, assets 200a, 200b, 200c). In some examples, the asset tracking server 110 further determines whether an asset 200a, 200b, 200c has left the welding area 300 and/or entered the welding area 300.

In some other examples, the separate hubs 160a, 160b may be replaced with a single hub having an antenna array and configured to determine directionality of signals received from assets. In such examples, the hub may determine a first location of the asset using a first directional determination, and determine a second location of the asset using a second directional determination. The hub may then send one or more signals to the asset tracking server to represent the multiple locations of the asset as detected by the hub.

In an example of operation, a first asset 304a is being transported through the welding area 300 in a first direction 306a. The example first asset 304a is a tag retaining asset 200c, and has a tag 180a attached that stores identifying information about the first asset 304a. The first asset 304a may be a wire feeder, a welding power supply, an operator badge, a welding helmet, an air-purifying respirator, a wire spool, a work order, a workpiece, a welding gun, a grinder, a fume extractor, a sensor module, a parts bin, and/or any other asset.

As the first asset 304a travels in the first direction 306a, the first asset 304a first enters the communication area 302a of the hub 160a. The hub 160a may repeatedly (e.g., continuously) emit wireless interrogation signals. When received by the first asset 304*a*, the interrogation signals cause the tag 180*a* to respond with the asset identifier and/or other information. For example, if the tag 180*a* is aware of the location of the first asset 304*a* (e.g., via GPS locating circuitry, communication with a location beacon 120, etc.), the tag 180*a* may further transmit location information to the hub 160*a* with the asset identifier.

Additionally or alternatively, one or more tags 180 may be configured to repeatedly (e.g., continuously, periodically, etc.) transmit an identification signal, including the asset identifier, within a communication area of the tag 180. As the asset and corresponding tag are moved, the communication area of the tag 180 moves. When the communication area of the tag 180 overlaps with a hub, gateway, mobile device, and/or other tracking device, the tracking device receives the asset identifier and any other information (e.g., location information) from the tag 180.

In the example of FIG. 3, the hub 160*a* obtains the asset identifier from the asset 304*a* at the time when the welding asset is within the communication area 302*a* of the hub 160*a* (e.g., the asset 304*a* is in in proximity to the hub 160*a*). In response to obtaining the asset identifier, the hub 160*a* transmits a first signal to the asset tracking server 110, in which the first signal includes or is representative of the asset identifier, the first location of the hub 160*a* and/or the location of the asset 304*a*, an identifier of the hub 160*a*, and/or the time at which the asset identifier was received at the hub 160*a*.

As the first asset 304*a* continues to travel generally in the first direction 306*a*, the first asset 304*a* enters the communication area 302*b* of the hub 160*b*. In the same manner as described above with respect to the hub 160*a*, the hub 160*b* obtains the asset identifier from the asset 304*a* when the asset 304*a* enters the communication area 302*b* and receives the interrogation signal from the hub 160*b*. In response to obtaining the asset identifier from the asset 304*a*, the hub 160*b* transmits a second signal to the asset tracking server 110, in which the second signal includes or is representative of the asset identifier, the second location of the hub 160*b* and/or the location of the asset 304*a*, an identifier of the hub 160*b*, and/or the time at which the asset identifier was received at the hub 160*b*. The example hubs 160*a*, 160*b* may be configured to report similar or identical information about the asset 304*a* to the asset tracking server 110, while providing different time information and/or hub identifying information representative of the tracking event.

As the asset 304*a* continues to travel in the first direction 306*a*, the asset 304*a* exits the communication area 302*a*. The example hub 160*a* may continue to identify the presence of the asset 304*a* within the communication area 302*a* (e.g., based on repeated responses by the tag 180*a* to repeated interrogation signals, or heartbeat transmissions), and identify an approximate time at which responses are no longer received from the tag 180*a* as the time at which the asset 304*a* left the communication area 302*a*. In some examples, the hub 160*a* may transmit a third signal to the asset tracking server 110 to indicate that the asset 304*a* has left the communication area 302*a*. Similarly, the hub 160*b* may identify and report to the asset tracking server 110 when the asset 304*a* has left the communication area 302*b*.

The example asset tracking server 110 receives the first signal from the hub 160*a* and the second signal from the hub 160*b*. The asset tracking server 110 may store or receive location information about the hubs 160*a*, 160*b* and/or the respective communication zones 302*a*, 302*b*. Using the respective times at which the asset 304*a* was detected entering the communication area 302*a* and the communication area 302*b*, and/or the respective times at which the asset 304*a* was detected leaving the communication area 302*a* and the communication area 302*b*, as well as the locations of the hubs 160*a*, 160*b* and/or the communication zones 302*a*, 302*b*, the asset tracking server 110 determines a travel direction of the first asset 304*a*. For example, in the arrangement illustrated in FIG. 3, using a temporal sequence of entering the communication area 302*a*, entering the communication area 302*b*, leaving the communication area 302*a*, and leaving the communication area 302*b*, the asset tracking server 110 may determine that the first asset 304*a* was present in the welding area 300 (and/or a sub-area of the welding area 300) at the reported time(s), and that the first asset 304*a* was traveling in the direction 306*a*. The asset tracking server 110 updates the asset tracking database 118 with location information, time information, status information, and/or direction information associated with the asset identifier.

Conversely, the asset tracking server 110 may determine that a second asset 304*b* having a second tag 180*b* is traveling in a second direction 306*b* based on signals from the hubs 160*a*, 160*b* identifying that the second asset 304*b* entered the communication area 302*b*, entered the communication area 302*a*, left the communication area 302*b*, and the left the communication area 302*a*, in order. Using these techniques, the asset tracking server 110 may determine the location and travel direction of assets for any desired arrangement of hubs 160 having respective communication areas 302.

Figure 4:
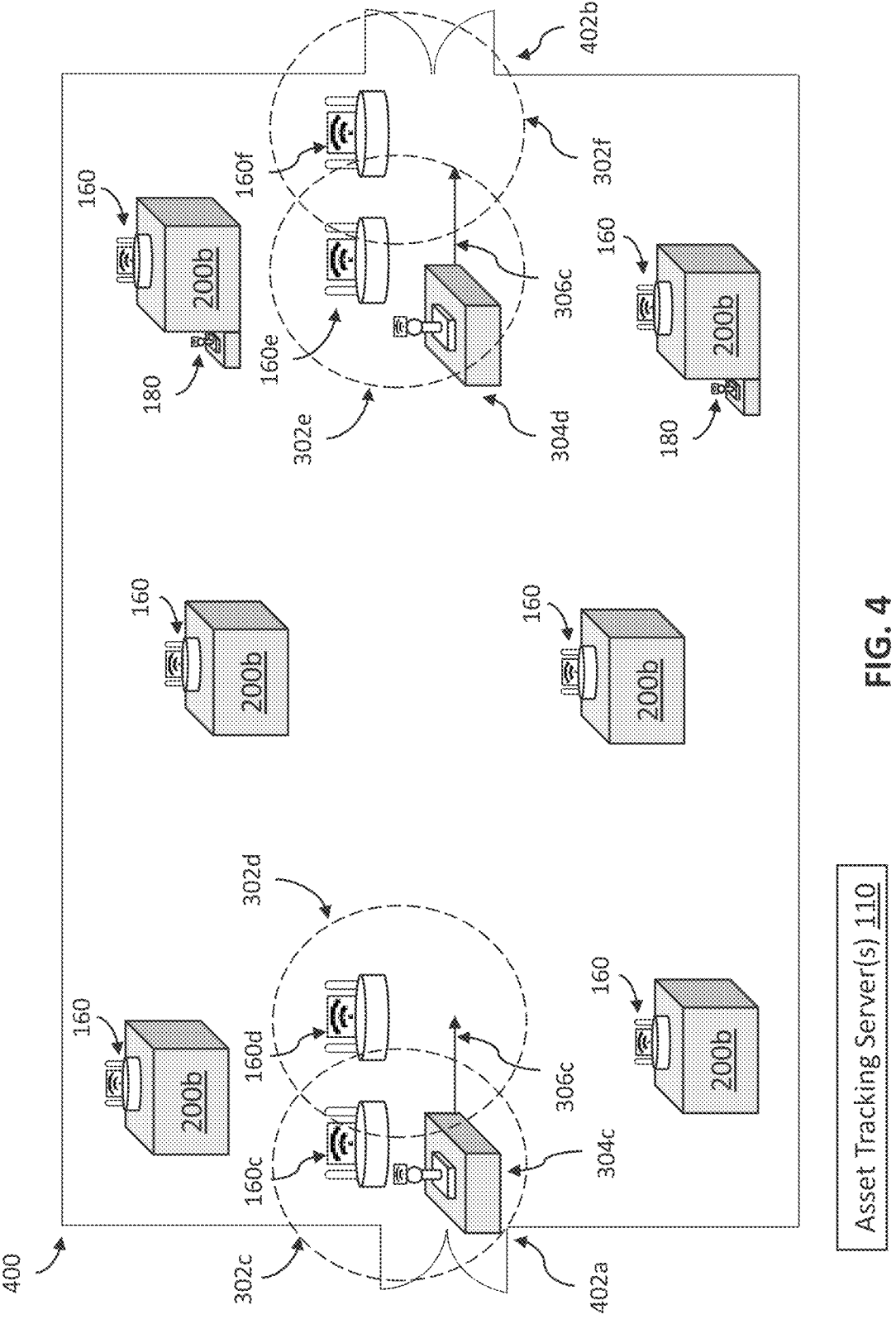
FIG. 4 is a diagram illustrating an example welding area with components of the welding asset tracking system of FIG. 1 configured to track movement of welding assets within the welding area, in accordance with aspects of this disclosure.

FIG. 4 is a diagram illustrating another example welding area 400 with components of the welding asset tracking system 100 of FIG. 1 configured to track movement of welding assets within the welding area 400. In the example of FIG. 4, hubs 160*c*, 160*d*, 160*e*, 160*f* are positioned in pairs within the welding area 400 adjacent entryways 402*a*, 402*b* (e.g., boundary, doorway, elevator, stairwell, ladder, etc.) to the welding area 400. A first pair of the hubs 160*c*, 160*d* are positioned adjacent to a first entryway 402*a* and a second pair of the hubs 160*e*, 160*f* are positioned adjacent to a second entryway 402*b*.

The example pairs of hubs 160*c*, 160*d*, 160*e*, 160*f* have respective communication areas 302*c*, 302*d*, 302*e*, 302*f*. The asset tracking server 110 determines travel directions of assets in a manner similar or identical to the example described above with reference to FIG. 3. Additionally, the example asset tracking server 110 may determine whether assets (e.g., an asset 304*c* traveling in a first direction 306*c*, an asset 304*d* traveling in the first direction 304*c*) are entering the welding area 400 and/or leaving the welding area 400 based on the determined direction of travel, and the locations of the hubs 160*c*, 160*d*, 160*e*, 160*f* near the entryways 402*a*, 402*b*.

Using the respective times at which the asset 304*c* was detected entering the communication area 302*c* and the communication area 302*d*, and/or the respective times at which the asset 304*c* was detected leaving the communication area 302*c* and the communication area 302*d*, as well as the locations of the hubs 160*c*, 160*d* and/or the communication zones 302*c*, 302*d*, the asset tracking server 110 determines a travel direction of the asset 304*c*. For example, in the arrangement illustrated in FIG. 3, using a temporal sequence of entering the communication area 302*c*, entering the communication area 302*d*, leaving the communication area 302*c*, and leaving the communication area 302*d*, the asset tracking server 110 may determine that the first asset 304*c* was present in the welding area 400 (and/or a sub-area of the welding area 400) at the reported time(s), and that the asset 304c was traveling in the direction 306c. Based on the proximity of the hubs 160c, 160d and/or the communication areas 302c, 302d to the entryway 402a, and the direction 306c of travel of the asset 304c, the asset tracking server 110 further determines that the asset 304c has entered the welding area 400 from outside of the area 400. Similarly, the asset tracking server 110 may determine that the asset 304d is leaving the area 400 based on the proximity of the hubs 160e, 160f and/or the communication areas 302e, 302f to the entryway 402b, and the direction 306c of travel of the asset 304d. The asset tracking server 110 updates the asset tracking database 118 with location information, time information, status information, and/or direction information associated with the asset identifier, and/or with entry and/or exit determinations.

While the examples of FIGS. 3 and 4 are disclosed with reference to hubs 160, other types of detectors, such as gateways 140 and/or mobile devices 104, may be used to identify assets and report identification of assets to the asset tracking server 110. For example, other hub retaining assets 200b and/or gateway retaining assets 200a may be configured to collect asset identifiers from passing assets 200c, and transmit signals including the asset identifiers, time information, location information, and/or other data that may be used by the asset tracking server 110 to determine locations and/or directions of travel of welding assets.

In some examples, the asset tracking server 110 may determine whether an enable command or a disable command are to be sent to an asset that is entering or leaving a welding area. For example, the asset tracking database 118 and/or the asset tracking server 110 may store and/or implement policies to deter unauthorized removal of welding assets from designated welding areas. An example policy includes commanding an asset to temporarily disable itself (e.g., to programmatically refuse to function, to set a locking mechanism, etc.) in response to a determination by the asset tracking server 110 that the asset has been removed from an authorized area by someone other than personnel authorized to do so. A welding asset may be configured to ignore a disable signal if an override code or similar exception is input to the welding asset.

In addition, or as an alternative, to the enable command and/or disable command, assets may remain enabled as long as the asset (e.g., via a tag 180) receives a heartbeat command from the system (e.g., via one or more hubs 160, gateways 140, location beacons 120, etc.). When the asset or tag 180 does not receive a heartbeat signal for at least a threshold time, the asset may self-disable (e.g., programmatically refuse to perform one or more functions, set a locking mechanism, etc.), emit a perceptible alert (e.g., emit an alarm sound, display a notification of the absence of the heartbeat signal, etc.), and/or take any other configured action in response to the lack of the heartbeat signal.

Similarly, the example asset tracking server 110 may periodically determine whether any assets and/or tags 180 have not been logged (e.g., by receiving the asset identifier via a hub 160, gateway 140, etc.) for a threshold period of time. The asset tracking server 110 flags (or otherwise identifies or marks) in the database 118 those assets and/or tags that are identified as not logged for the threshold period of time. Flagging an asset may cause the asset tracking server 110 to take a notification action (e.g., immediately and/or periodically notifying designated personnel of a list of "missing" assets), and/or to take one or more actions upon a subsequent receipt of the asset identifier (e.g., when the asset is returned or otherwise reconnected to the asset tracking network). For example, if an asset identifier has not been logged in the database 118 for at least 14 days, the asset tracking server 110 may notify an equipment manager (e.g., via email, text message, etc.) of the status of the asset and/or the last known location of the asset, and/or notify an equipment manager upon the next communication with or identification of the asset identifier.

The asset tracking server 110 may determine that an asset is authorized to leave with an authorized person based on comparing sets of locations between the asset and authorized individuals to determine whether the asset is in proximity to such authorized individuals. If the asset is not authorized to leave but is determined to be leaving the authorized area, the example asset tracking server 110 may transmit a disable signal to one or more hubs 160, gateways 140, and/or mobile devices 104. The disable signal identifies an asset identifier to be disabled. In response to receiving the disable signal identifying a welding asset, the one or more hubs 160, gateways 140, and/or mobile devices 104 respond to subsequent communications with the identified welding asset by sending a disable command to the welding asset.

Upon receiving the disable command, the welding asset may configure one or more hardware, firmware, and/or software features to prevent use of the welding asset until a subsequent enable signal is received. The disable and/or enable commands may be encrypted, and/or otherwise securely transmitted to the welding asset to prevent circumvention.

While the examples above describe disabling the asset, other actions and/or levels of response may be taken. For example, the asset tracking server 110 may perform different actions based on the type and/or value of the asset that has been identified as leaving. As an example, low-value assets and/or assets that cannot effectively be disabled may cause the asset tracking server 110 to log or record the asset leaving (e.g., time, location, asset identifier, description of the asset, etc.), to alert an equipment manager (and/or other personnel), and/or to cause an alarm to be activated on the tag 180 of the departing asset in a similar manner as the disable signal. Conversely, higher-value assets may result in the asset tracking server 110 logging the departure, alerting the equipment manager, and/or sending the disable signal to the asset.

Upon later receipt of an enable command (e.g., in a similar manner as the disable command is distributed to the asset), the welding asset may reset the disabling features to re-enable operation of the asset.

While some types of welding assets may be effectively disabled, other types of assets may be undesirable or impractical to disable. For example, disabling of work orders, welding wire, workpieces, operator badges, and/or other types of assets, may be undesirable and/or impractical to implement.

In some examples, the asset tracking server 110 (e.g., via the processing circuitry 116) provides a map illustrating a travel path and/or a location of an asset via a user interface (e.g., in response to a request for information about an asset). For example, the asset tracking server 110 may retrieve historical location and travel direction information stored in the asset tracking database 118, correlate the locations and directions to a map of one or more welding areas, and provide the map including determined locations and/or directions, as well as interpolated locations and/or directions, to a user interface (e.g., a web interface, an application interface, etc.). In this manner, a supervisor or equipment manager may more easily determine the location of a requested asset by viewing the determined path of travel of the asset.

Figure 5A:
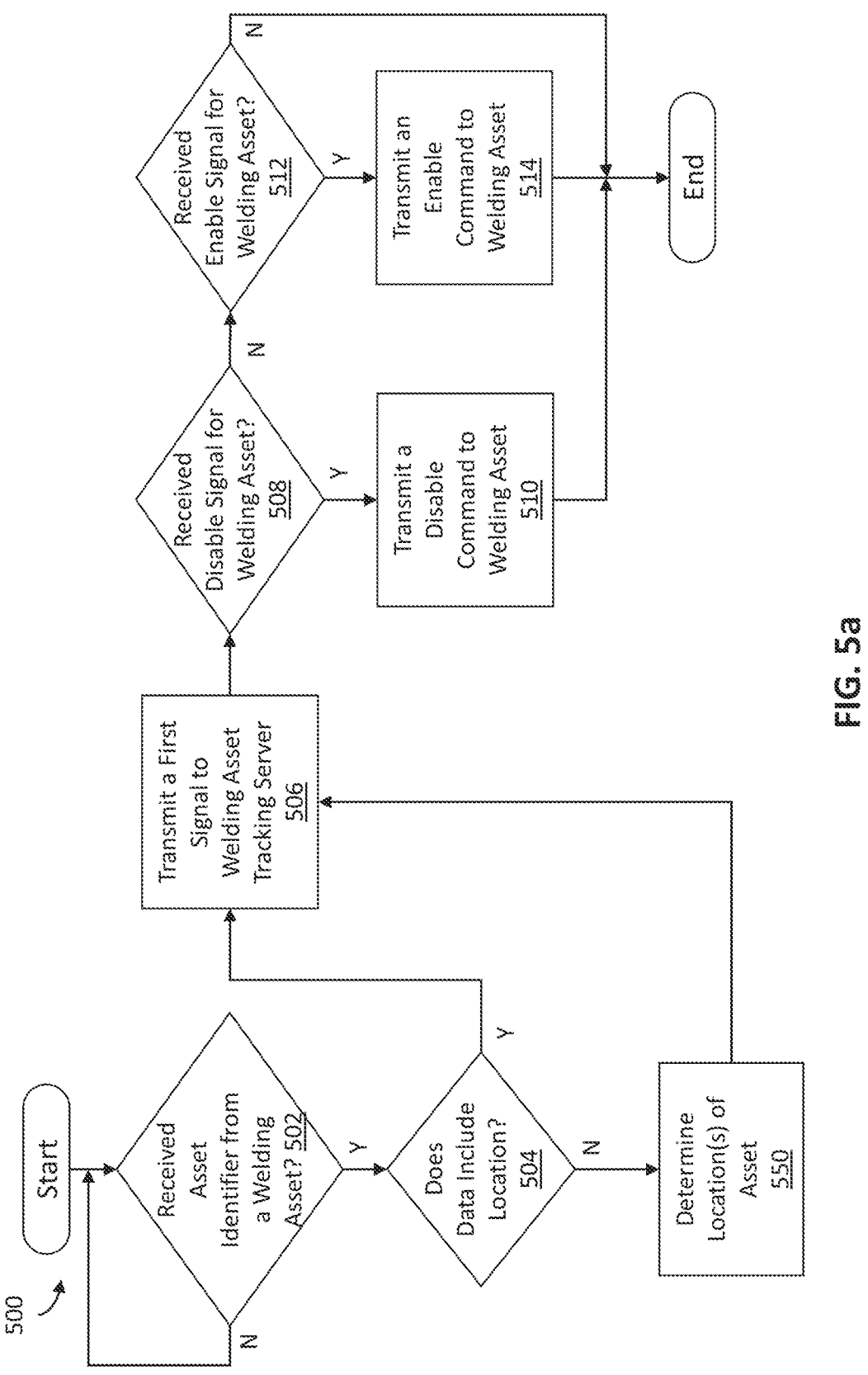
FIGS. 5a and 5b are flowcharts representative of example machine readable instructions which may be performed by the example hubs 160 of FIGS. 3 and/or 4 to track movement of welding assets within a welding area, in accordance with aspects of this disclosure.

FIG. 5a is a flowchart representative of example machine readable instructions 500 which may be performed by the example hubs 160 of FIGS. 3 and/or 4 to track movement of welding assets 200a, 200b, 200c within a welding area (e.g., the welding areas 300, 400 of FIGS. 3 and 4).

At block 502, the communication circuitry 164 determines whether an asset identifier has been received from a welding asset (e.g., the first asset 304a of FIG. 3). If an asset identifier has not been received (block 502), control returns to block 502 to monitor for an asset identifier. When an asset identifier is received (block 502), at block 504 the control circuitry 166 determines whether the received data includes location information. For example, some asset tags 180 may provide location information. If location information is not included (block 504), at block 550 the control circuitry 166 determines a location of the asset. An example implementation of block 550 is described below with reference to FIG. 5b.

After determining the location of the asset (block 550), or if the location information is included (block 504), at block 506 the communication circuitry 164 transmits a first signal to the asset tracking server 110. In some examples, the hub 160 may transmit the first signal via a gateway 140, a mobile device 104, and/or other intermediary or gateway if the hub 160 does not have the appropriate communication circuitry or protocols to communicate directly (e.g., via network infrastructure) with the asset tracking server 110. An example first signal includes or represents the asset identifier, the time at which the asset identifier was received, and the location of the asset (e.g., a location of the hub 160a, 160b, a description of the communication area 302a, 302b, a given location of the asset 304a, etc.).

At block 508, the communication circuitry 164 determines whether a disable signal has been received (e.g., from the asset tracking server 110) for the welding asset 304a. The disable signal may have been received before receipt of the asset identifier from the asset tag 180a, and/or in response to the first signal. If a disable signal has been received (block 508), at block 510 the communication circuitry 164 transmits a disable command to the welding asset 304a (e.g., to the tag 180a). The disable command may instruct the welding asset 304a (e.g., via the tag 180a) to prevent operation of the welding asset 304a via hardware, software, and/or firmware techniques.

If a disable signal has not been received (block 508), at block 512 the communication circuitry 164 determines whether an enable signal has been received (e.g., from the asset tracking server 110) for the welding asset 304a. The enable signal may have been received before receipt of the asset identifier from the asset tag 180a, and/or in response to the first signal. If an enable signal has been received (block 512), at block 514 the communication circuitry 164 transmits an enable command to the welding asset 304a (e.g., to the tag 180a). The enable command may instruct the welding asset 304a (e.g., via the tag 180a) to re-enable operation of the welding asset 304a following a disable command, via hardware, software, and/or firmware techniques.

After transmitting the enable command (block 514), transmitting the disable command (block 510), or if an enable signal has not been received (block 512), the example instructions 500 may end.

Figure 5B:
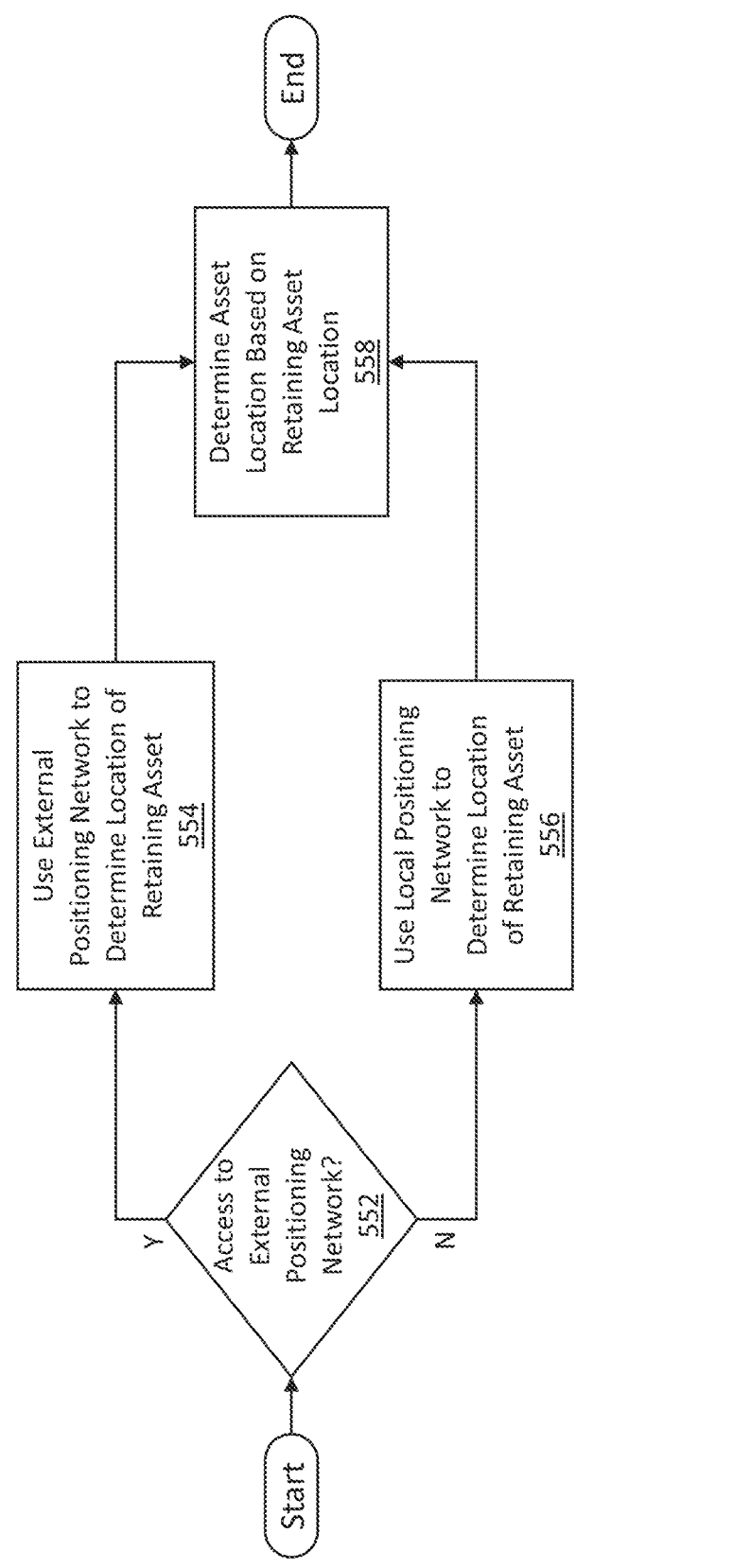

FIG. 5b is a flowchart representative of example machine readable instructions 550 which may be performed by the example hubs 160 of FIGS. 3 and/or 4 to determine a location of an asset. The example instructions 550 may be performed to implement block 550 of FIG. 5a.

As shown, the determine asset location(s) block 550 begins at block 552, in which the control circuitry 166 determines whether the hub communication circuitry 164 is configured to access an external positioning system 108 (e.g., GPS, WiFi, and/or cellular positioning system). If so, at block 554 the control circuitry 166 determines the position of the hub retaining welding asset 200b (and/or hub 160) is determined via communication with the external positioning system 108. In some examples, the determined position may comprise an approximate position with a radius of uncertainty (e.g., position is within 30 m radius of given latitude/longitude). In some examples, the control circuitry 166 may also use the local positioning system at block 556 (e.g., to more precisely determine the location).

If the control circuitry 166 determines the hub communication circuitry is not configured to access an external positioning system 108 (block 552), at block 556 the control circuitry 166 uses the local positioning system to determine a location of the hub retaining welding asset 200b (and/or hub 160). In some examples, using the local position system may include communicating (e.g., via hub communication circuitry 164) with one or more location beacons 120 in communication range of the hub 160 to obtain the one or more beacon locations 128 corresponding to the one or more location beacons 120. In some examples, the control circuitry 166 may determine a location of the hub retaining welding asset 200b using the one or more location beacons 120. In some examples, the determined location may be an approximate location with a degree of uncertainty (e.g., position is within 30 m radius of given latitude/longitude, position is somewhere within welding cell 10, etc.). In some examples, the degree of uncertainty may be based at least partially on the communication range of the beacon communication circuitry 124 and/or hub communication circuitry 164 (e.g., hub 160 within communication range of beacon location 128). In examples, where more than one location beacons 120 and/or beacon locations 128 are used, the control circuitry 166 may use trilateration and/or triangulation methods to make the location more precise.

After determining the location of the retaining asset (block 554 or block 556), at block 558, the control circuitry 166 determines one or more other locations of one or more other welding assets 200. In some examples, the control circuitry 166 may determine the other locations of the one or more other welding assets 200 based on the determined location of the hub retaining welding asset 200. For example, the control circuitry 166 may consider the communication range of the tag communication circuitry 184 with which the hub communication circuitry 164 has communicated (and/or the hub communication circuitry 164), and determine that the corresponding tag 180 and/or tag retaining welding asset 200c must be within communication range of the location of the hub 160. As another example, the control circuitry 166 may determine that the tag data was obtained via the barcode scanner 168, and determine that the corresponding tag 180 and/or tag retaining welding asset 200c must be within a scanning of the barcode scanner 168. In some examples, the control circuitry 166 may send the determined location(s) (and/or time(s) of the determination(s)) to the welding asset(s) 200 (and/or retained tag(s) 180, hub(s) 160, and/or gateway(s) 140) for storage in memory circuitry, and/or store the location(s) in the hub memory circuitry 162.

In some examples, block 558 may be performed by the asset tracking server 110 (e.g., via the processing circuitry 116) rather than the hub 160. For example, hubs 160 and/or gateways 140 may periodically determine their own locations and send to the asset tracking server 110 (along with their identifier(s)). Thereafter, the asset tracking server 110 may determine which hub 160 and/or gateway 140 obtained which tag data (and/or hub data) and use the last received location of the hub and/or gateway 140 to determine the location of the tag retaining welding asset 200*c* corresponding to the tag data (and/or hub retaining welding asset 200*b* corresponding to the hub data). In some examples, block 558 may be skipped altogether. In the example of FIG. 5*b*, the instructions 550 end after block 558 and control returns to block 506 of FIG. 5*a*.

Figure 6:
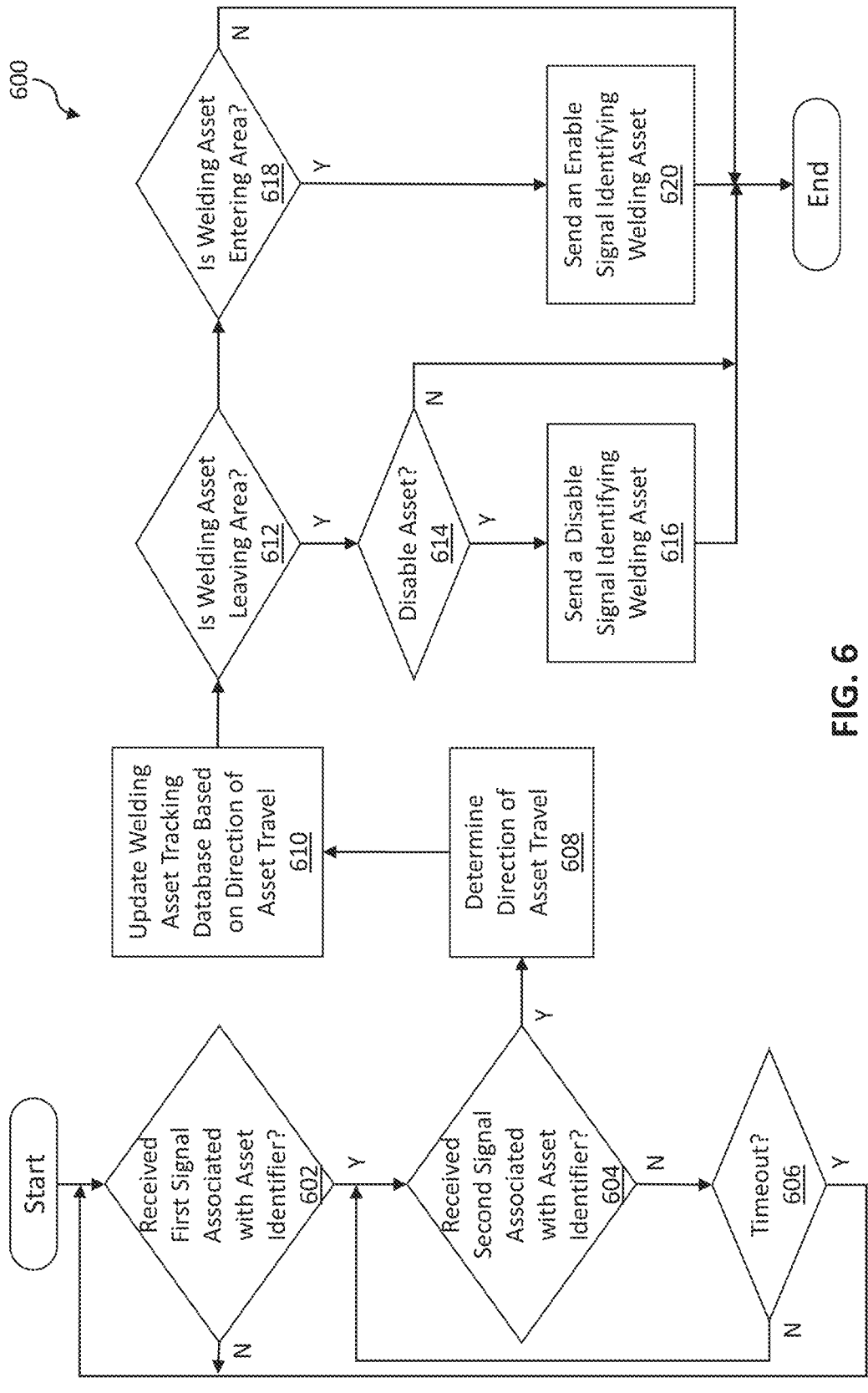
FIG. 6 is a flowchart representative of example machine readable instructions which may be performed by the example asset tracking server 110 of FIGS. 3 and/or 4 to track movement of welding assets within a welding area, in accordance with aspects of this disclosure.

FIG. 6 is a flowchart representative of example machine readable instructions 600 which may be performed by the example asset tracking server 110 of FIGS. 3 and/or 4 to track movement of welding assets 200*a*, 200*b*, 200*c* within a welding area (e.g., the welding areas 300, 400 of FIGS. 3 and 4). The example instructions 600 are described below with reference to the asset tracking server 110 of FIG. 1.

At block 602, the communication circuitry 114 determines whether a first signal associated with an asset identifier has been received. For example, the communication circuitry 114 may receive messages including an asset identifier from a hub 160 or other device that has detected an asset. If a first signal has not been received (block 602), control returns to block 602 to monitor for the first signal.

If the first signal has been received (block 602), at block 604 the communication circuitry 114 determines whether a second signal associated with the asset identifier has been received. The second signal is received from a different hub 160 or other device than the first signal, and is received at a later time than the first signal. If a second signal has not been received (block 604), at block 606 the example communication circuitry 114 determines whether a timeout has occurred. For example, a timeout timer may be initiated when the first signal is received at block 602.

If the timeout has not occurred (block 606), control returns to block 604 to monitor for the second signal. If the timeout has occurred (block 606), control returns to block 602. For example, if a second signal is not received prior to the timeout, the first signal may be discarded and the communications circuitry 114 monitors for a new first signal.

If a second signal has been received (block 604), at block 608 the processing circuitry 116 determines a direction of asset travel based on the first and second signals. For example, the processing circuitry 116 may determine the direction of asset travel based on the locations of the communication areas associated with the hubs 160 that reported the asset identifier and the order in which the asset identifier was observed entering the communication areas (e.g., as determined by the times reported in the first signal and the second signal).

At block 610, the processing circuitry 116 updates a welding asset tracking database (e.g., the database 118) based on the direction of asset travel and the location of the asset. For example, the processing circuitry 116 may store a time at which the asset identifier was observed by the hubs 160, and a direction in which the asset was determined to be traveling.

In some examples, the asset tracking server 110 may use a combination of observations of the location and/or direction of the asset (e.g., based on stored tracking information in the asset tracking database 118) to display a path of the asset on a map of one or more welding areas. For example, the processing circuitry 116 may interpolate the movement of the asset based on locations of observations, times of the observations, and determined directions, and present the path and/or location of the asset to an equipment manager, supervisor, or other user requesting information about the asset.

At block 612, the processing circuitry 116 determines whether the welding asset is leaving a designated area. For example, the processing circuitry 116 may determine whether the observed location (e.g., the locations of the hubs 160*e*, 160*f* of FIG. 4) and the determined direction of the asset (e.g., the direction 306*d*) indicate or suggest that the asset is leaving the area via an entryway (e.g., the entryway 402*b* of FIG. 4). If the welding asset is determined to be leaving the area (block 612), at block 614 the processing circuitry 116 may determine whether the asset is to be disabled. For example, the processing circuitry 116 may determine whether the asset is a type that can be effectively disabled (e.g., a wire feeder, a power supply, etc.), whether the asset is covered by a policy (e.g., stored in the database 118) that provides whether the asset is to be disabled, and/or whether the asset is associated with personnel who are authorized to remove the asset from the area.

If the welding asset is to be disabled (block 614), at block 616 the communication circuitry 114 sets a disable signal identifying the welding asset. For example, the disable signal may cause hubs 160, gateways 140, mobile devices 104, and/or any other devices that subsequently communicate with the welding asset identified in the disable signal to command the asset to trigger a disable routine, in which the asset is prevented from being operated until an enable command is received at the asset.

If the welding asset is not determined to be leaving the area (block 612), at block 618 the processing circuitry 116 determines whether the welding asset is entering the area. For example, the processing circuitry 116 may determine whether the observed location (e.g., the locations of the hubs 160*c*, 160*d* of FIG. 4) and the determined direction of the asset (e.g., the direction 306*c*) indicate or suggest that the asset is leaving the area via an entryway (e.g., the entryway 402*a* of FIG. 4).

If the welding asset is entering the area (block 618), at block 620 the communication circuitry 114 sends an enable signal identifying the welding asset. For example, the disable signal may cause hubs 160, gateways 140, mobile devices 104, and/or any other devices that subsequently communicate with the welding asset identified in the enable signal to command the asset to trigger an enable routine (or turn off a disable routine), to enable the asset to be operated. In some examples, the processing circuitry 116 may determine whether the enable signal is appropriate prior to sending the enable signal.

After sending the enable signal (block 620), if the welding asset is not entering the area (block 618), after sending the disable signal (block 616), or if the asset is not to be disabled (block 614), the example instructions 600 end.

The asset tracking server 110 may execute or implement the example instructions 600 for any number of assets at a given time.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding, cladding, brazing, plasma cutting, induction heating, carbon arc cutting, and/or hot wire welding/preheating (including laser welding and laser cladding), carbon arc cutting or gouging, and/or resistive preheating.

As used herein, welding-type power refers power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A welding asset tracking system, comprising:
a first detector positioned at a first detector location proximate a portal or boundary of a welding area, the first detector configured to:
obtain a tag identifier of a tag, or an asset identifier of a welding asset comprising the tag, at a first time when the welding asset is in proximity of the first detector, and
transmit one or more first signals representative of (i) a first detector identifier of the first detector, or the first detector location of the first detector, (ii) the asset identifier, or the tag identifier, and (iii) the first time;
a second detector positioned at a second detector location that is closer to, or farther from, the portal or boundary than the first detector location, the second detector configured to:
obtain the tag identifier or the asset identifier at a second time when the welding asset is in proximity of the second detector, and
transmit one or more second signals representative of (i) a second detector identifier of the second detector, or the second detector location of the second detector, (ii) the asset identifier, or the tag identifier, and (iii) the second time; and
a welding asset tracking server configured to:
receive the one or more first signals and the one or more second signals,
determine a travel direction of the welding asset based on the first detector location of the first detector, the first time, the second detector location of the second detector, and the second time, and
in response to determining the travel direction is towards or away from the portal or boundary of the welding area, update a welding asset tracking database to indicate the welding asset has entered into, or departed from, the welding area.

2. The system of claim 1, wherein the first detector comprises first communication circuitry configured to obtain the tag identifier or the asset identifier from the tag of the welding asset, and the second detector comprises second communication circuitry configured to obtain the tag identifier or the asset identifier from the tag of the welding asset.

3. The system of claim 1, wherein the welding asset tracking server is configured to send an enable signal to the welding asset through the first detector or second detector in response to determining the welding asset has entered into the welding area.

4. The system of claim 1, wherein the welding asset tracking server is configured to send a disable signal to the welding asset via the first detector or the second detector in response to determining the welding asset has departed from the welding area.

5. The system of claim 1, wherein the welding asset comprises a wire feeder, welding power supply, operator badge, welding helmet, air-purifying respirator, wire spool, wire barrel, work order, workpiece, welding gun, grinder, fume extractor, foot pedal, gas bottle regulator, power supply pendant, weld cable, or sensor module.

6. The system of claim 1, wherein the welding asset comprises a first welding asset, and the first detector or second detector is retained by a second welding asset.

7. The system of claim 1, wherein the first detector or second detector comprises a gateway.

8. The system of claim 1, wherein the first detector comprises a first portion of a gateway and the second detector comprise a second portion of the gateway.

9. The system of claim 1, wherein the first detector or second detector comprises a hub, or the first detector comprises a first portion of the hub and the second detector comprises a second portion of the hub.

10. The system of claim 1, wherein the first detector is configured to obtain the tag identifier wirelessly.

11. The method of claim 1, wherein the welding asset comprises a wire feeder, welding power supply, operator badge, welding helmet, air-purifying respirator, wire spool, wire barrel, work order, workpiece, welding gun, grinder, fume extractor, foot pedal, gas bottle regulator, power supply pendant, weld cable, or sensor module.

12. A method of determining a travel direction of a welding asset moving through a welding area, comprising:
receiving, at a welding asset tracking server, one or more first signals from a first detector, the one or more first signals being representative of (i) a tag identifier of a tag, or an asset identifier of a welding asset comprising the tag, (ii) a first detector position of the first detector, or a first detector identifier of the first detector, and (iii) a first time when the first detector obtained the tag identifier or the asset identifier;
receiving, at the welding asset tracking server, one or more second signals from a second detector, the one or more second signals being representative of (i) the tag identifier of the tag, or the asset identifier of the welding asset comprising the tag, (ii) a second detector position of the second detector, or a second detector identifier of the second detector, and (iii) a second time when the second detector obtained the tag identifier or the asset identifier;
determining, via processing circuitry of the welding asset tracking server, a travel direction of the welding asset based on the first detector position, the first time, the second detector position, and the second time; and
in response to determining the travel direction is towards or away from a portal or boundary of the welding area, updating a welding asset tracking database to indicate the welding asset has entered into or departed from the welding area.

13. The method of claim 12, wherein the first detector is positioned at the first detector position proximate a portal or boundary of a welding area and the second detector is positioned at the second detector position that is closer to, or farther from, the portal or boundary than the first detector position.

14. The method of claim 13, wherein the tag comprises an RFID tag.

15. The method of claim 12, wherein the one or more second signals are representative of the second detector identifier, the method further comprising determining, via the processing circuitry, the second detector position based on the second detector identifier.

16. The method of claim 13, wherein the one or more first signals are representative of the first detector identifier of the first detector, wherein the method further comprises determining the first detector position based on the first detector identifier.

17. The method of claim 16, wherein determining the first detector position comprises looking up a stored detector position corresponding to the first detector identifier.

18. The method of claim 12, further comprising sending an enable signal to the welding asset through the first detector or second detector in response to determining the welding asset has entered into the welding area.

19. The method of claim 12, further comprising sending a disable signal to the welding asset through the first detector or the second detector in response to determining the welding asset has departed from the welding area.

20. The method of claim 12, wherein the welding asset comprises a first welding asset, and the first detector or second detector is retained by a second welding asset.

* * * * *